Sept. 12, 1967         V. R. RJABOV ETAL         3,341,680
       METHOD OF WELD-JOINTING ALUMINUM
        AND ALUMINUM ALLOYS WITH STEEL
              Filed April 3, 1964

United States Patent Office 3,341,680
Patented Sept. 12, 1967

3,341,680
METHOD OF WELD-JOINTING ALUMINUM AND ALUMINUM ALLOYS WITH STEEL
Vladimir Rafailovich Rjabov, Daniil Markovich Rabkin, and Alttsia Valerjanovna Lozovskaja, Kiev, U.S.S.R., assignors to Institute Elektrosvarki im E.O. Patona, Kiev, U.S.S.R.
Filed Apr. 3, 1964, Ser. No. 357,202
11 Claims. (Cl. 219—73)

The invention relates to methods of arc welding materials possessing different physical, chemical and mechanical properties, such as aluminum or its alloys, and steel.

An existing method of welding aluminum or aluminum alloys to steel requires the steel piece to first be copper-plated and then galvanized, after which welding is performed using aluminum wire as a filler metal. This method consumes much labor because of the complex treatment required of the steel piece before it may be welded.

Another existing method of welding aluminum or aluminum alloys to steel requires that a bimetallic insert be interposed between the two metal pieces to be joined. This insert has a cold-rolled package of aluminum and steel plates. This method also has disadvantages because it involves the use of specially designed and costly equipment.

It is an object of the present invention to eliminate these and other disadvantages.

Another object of this invention is to develop a method of welding aluminum or aluminum alloys to steel according to which welded joints of the required strength can be obtained by a comparatively simple process.

The foregoing objects are attained, according to the present invention, by hidden arc welding of aluminum or aluminum alloys to steel on a layer of flux, using filler metal composed of aluminum alloys and certain elements to promote fusion of aluminum and steel; zinc can be introduced as the additional element into the arc zone under the flux in the course of welding to achieve direct fusion of aluminum and steel. Zinc may be introduced in the form of one or more plates placed onto the surfaces of the pieces to be welded, so that the zinc should enter the molten bath during the process of welding. In addition to that, the filler material used in welding may also contain zinc.

This method provides for welded joints of high quality being obtained by a simple process of welding of aluminum or its alloys to steel.

The method of welding according to the present invention will be better understood from the following detailed description, reference being made to the accompanying drawings, in which.

Figure 1:
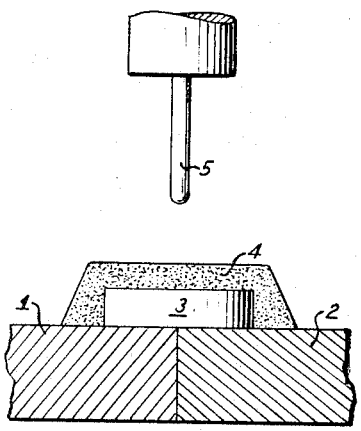
FIG. 1 illustrates the relative positions of the zinc plate and the pieces to be butt-welded without bevelling of edges.

To butt-weld metal pieces without bevelling of the edges and using as an electrode an aluminum filler wire, a zinc plate 3 (FIG. 1) 6 to 8 mm. thick and 20 to 25 mm. wide is placed directly over the proposed joint onto the stripped surfaces of the steel piece 1 and aluminum piece 2. The zinc plate 3 is also thoroughly cleaned prior to welding. Then, zinc plate 3 and the surfaces of the steel piece 1 and aluminum piece 2 are covered with flux 4. Aluminum filler wire 5 (electrode) is placed symmetrically in reference to the joint.

Figure 2:
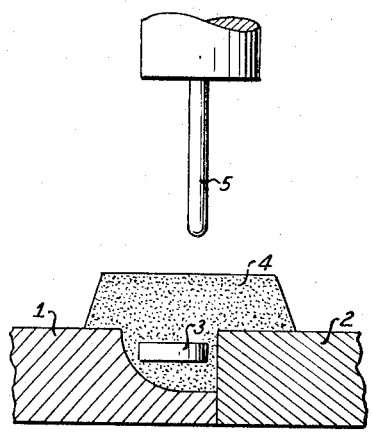
FIG. 2 is the same as in FIG. 1, but with the edges bevelled.
Figure 3:
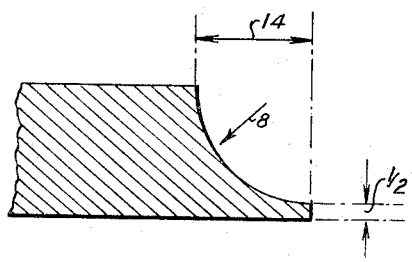
FIG. 3 shows the bevelled edge of a steel piece.

In the case of a butt-welding process in which an edge of the steel piece is beveled as shown in FIG. 2, the zinc plate 3 is placed into a cavity defined by the bevel and the abutting end of the aluminum piece. An edge of the zinc plate may protrude above the edges of the pieces. The aluminum filler wire 5 (electrode) is placed above the joint some 3 or 4 mm. closer to the steel piece than to the aluminum one. The steel piece 1 is beveled with dimensions as shown in FIG. 3.

Figure 4:
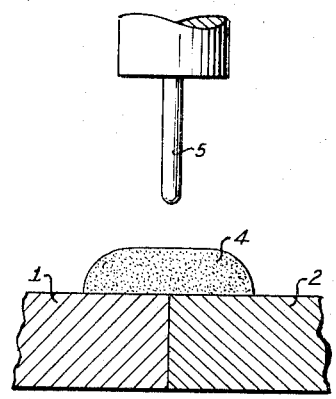
FIG. 4 illustrates the respective positions of the details to be welded when zinc-alloyed aluminum filler wire is used.

In a butt-welding process wherein the filler wire comprises an aluminum zinc alloy the surfaces of both the steel piece 1 (FIG. 4) and the aluminum piece 2 are stripped and covered with flux. The filler wire 5 (electrode) is placed in the same manner, as has been described for the case of welding with and without bevelling of the edges of the steel piece 1.

Butt-welding of metal pieces up to 20 mm. thick was performed with the help of a tractor head, the electric current value ranging from 380 A. to 420 A., the welding rate being 21.5 meters per hour, filler wire feed rate— 290 meters per hour, arc voltage value—from 36 to 40 v.

The filler wire electrode had the following composition:

| | Percent |
|---|---|
| Zinc | 20 to 25 |
| Silicon | 3 to 5 |
| Copper | 2 to 2.5 |
| Aluminum | 67.5 to 75 |

In the course of welding, the zinc is the first to melt, creating a molten bath which protects the steel and aluminum surfaces, ensures better spreading of aluminum over the steel surface and improves the welding process.

The bath with molten metal is the source of a welded joint or seam of complex structure. The joint or weld seam so produced is a fusion of aluminum and zinc (up to 15%–20%) with additions of iron, said iron being derived from the steel piece.

Zinc, which is an alloying element contained in high percentage in the molten metal, promotes filling of the structural defects of the steel and aluminum joint due to its cooling and crystallization of the metals; zinc also reduces the solubility of iron in the molten bath, whereby there is a very fine, if any, brittle film on the line of fusion of aluminum or its alloy with steel.

The metal of the welded joint obtained by the above-described method of welding is noted for its good cohesion with the parent metal. The bending angle in this case is as high as 35 to 45 degrees.

Test pieces with a welded joint produced by the process described above have proved to be of adequate strength in rupture tests, the rupture occurring primarily in the parent material of the aluminum alloy.

By the proposed method of welding, aluminum or its alloys can be T-jointed with steel. For this purpose, the process of welding should be carried out, as it has been described above for the case of butt-welding without edge-bevelling.

In the case where the proposed method is used for coating steel with aluminum with the help of aluminum wire, the buildup surface also settles firmly onto the parent metal, has good plasticity and allows bending up to 90 degrees without failure.

An adequate plasticity of the buildup metal makes possible further welding of elements made of aluminum alloys, for example, T-jointing a steel flange to the upright wall made of an alloy of aluminum and magnesium. When the wall with the flange jointed thereto was struck with a hammer, the wall itself bent, but the joint remained unharmed.

The test proved, that a steel-to-aluminum joint produced by the proposed method of welding has the ultimate strength at least equal to the ultimate strength of aluminum or the aluminum alloy.

What we claim is:

1. A method of welding steel to aluminum and aluminum alloys, said method comprising stripping portions of a steel member and an aluminum containing member, contacting said members at their thusly stripped portions in a configuration into which said members are to be welded, placing a cleaned zinc plate on the thusly contacted members, covering the contacted members and thereupon placed zinc plate with flux, subjecting said contacted members, zinc and flux to an electric arc from a consumable electrode comprising aluminum to first melt the zinc and then a portion of the electrode to form a molten bath, said molten bath comprising a mixture of aluminum and zinc which mixture together with iron from the steel member forms a weld seam between the members.

2. A method as claimed in claim 1, comprising bevelling the steel member before contacting same with the aluminum containing member to provide a cavity between the contacted members.

3. A method as claimed in claim 2, wherein the zinc plate is placed within the cavity, and the weld seam fills the cavity.

4. A method as claimed in claim 3, wherein the aluminum containing member comprises an aluminum-magnesium alloy.

5. A method as claimed in claim 1, wherein the aluminum containing member comprises an aluminum-magnesium alloy.

6. A method of welding steel to aluminum and aluminum alloys, said method comprising stripping portions of a steel member and an aluminum containing member, contacting said members at their thusly stripped portions in a configuration into which said members are to be welded, covering the contacted members with flux, subjecting the flux covered members to an electric arc from a consumable electrode comprising an aluminum-zinc alloy, said electrode being disposed above the flux covered contacted members and being partially melted by the electric arc to form a molten bath comprising a mixture of aluminum and zinc, which mixture together with iron from the steel member forms a weld seam between the members.

7. A method as claimed in claim 6, wherein the electrode comprises silicon and copper.

8. A method as claimed in claim 7, wherein the electrode is constituted of 20–25% zinc, 2–5% silicon, 2–2.5% copper and 67.5–75% aluminum.

9. A method as claimed in claim 6, wherein the zinc in the weld seam comprises up to 15–20%.

10. A method as claimed in claim 9, wherein the aluminum containing member comprises an aluminum-magnesium alloy.

11. A method as claimed in claim 6, wherein the aluminum containing member comprises an aluminum-magnesium alloy.

References Cited

UNITED STATES PATENTS

| 2,790,656 | 4/1957 | Cook | 219—137 X |
| 2,985,530 | 5/1961 | Fetzer et al. | 75—146 |
| 3,202,793 | 8/1965 | Bertels | 219—118 |

RICHARD M. WOOD, *Primary Examiner.*

J. V. TRUHE, *Assistant Examiner.*